United States Patent

Spacek

[15] 3,673,863

[45] July 4, 1972

[54] FUEL CONSUMPTION INDICATOR

[72] Inventor: George Ctirad Spacek, 967 La Senda, Santa Barbara, Calif. 93105

[22] Filed: Feb. 24, 1970

[21] Appl. No.: 888,561

[52] U.S. Cl. ..............................73/114, 73/209, 250/237 R
[51] Int. Cl. ..........................................................G01l 3/26
[58] Field of Search ..........................73/114, 401, 209, 210; 250/218, 237

[56] References Cited

UNITED STATES PATENTS

| | | | |
|---|---|---|---|
| 352,647 | 11/1886 | Ghegan | 250/218 X |
| 2,178,422 | 10/1939 | Heaghey | 73/182 UX |
| 2,455,243 | 11/1948 | Epprecht | 250/218 X |
| 2,503,091 | 4/1950 | Brooke, Jr. et al. | 73/209 UX |
| 2,755,664 | 7/1956 | Chapman | 73/209 |
| 2,912,858 | 11/1959 | Fuller | 73/209 |
| 3,025,405 | 3/1962 | Dadas | 73/401 X |
| 3,204,452 | 9/1965 | Sorenson et al. | 73/209 X |

FOREIGN PATENTS OR APPLICATIONS

| | | | |
|---|---|---|---|
| 112,123 | 1964 | Czechoslovakia | 73/401 |
| 1,339,716 | 9/1963 | France | 73/114 |

*Primary Examiner*—Jerry W. Myracle

[57] ABSTRACT

This invention relates to methods and means of measuring fuel consumption of vehicles propelled by combustion engines, and of stationery combustion engines. This invention relates also to methods and means of generating electrical signal in proportion to the speed of the vehicle, particularly sailboats and sailplanes, whether propelled by an engine or not. In the case of stationery combustion engines, the invention relates to methods and means of generating electrical signal in proportion to the flow of the fuel, and utilizing these electrical signals to give the operator instantaneously information about fuel consumption, preferably in gallons per hour, of the engine. In the case of vehicles propelled by combustion engines, the invention relates to methods and means of generating electrical signals in proportion to the speed of the vehicle, and of utilizing these electrical signals to give the operator of the vehicle information about fuel consumption per unit time, preferably in gallons per hour, to give the operator information about fuel consumption per distance travelled, preferably in miles per gallon, and to give the operator information about speed of the vehicle, preferably in miles per hour.

6 Claims, 12 Drawing Figures

PATENTED JUL 4 1972 3,673,863
SHEET 1 OF 3

Inventor:
George Etirad Spaeth

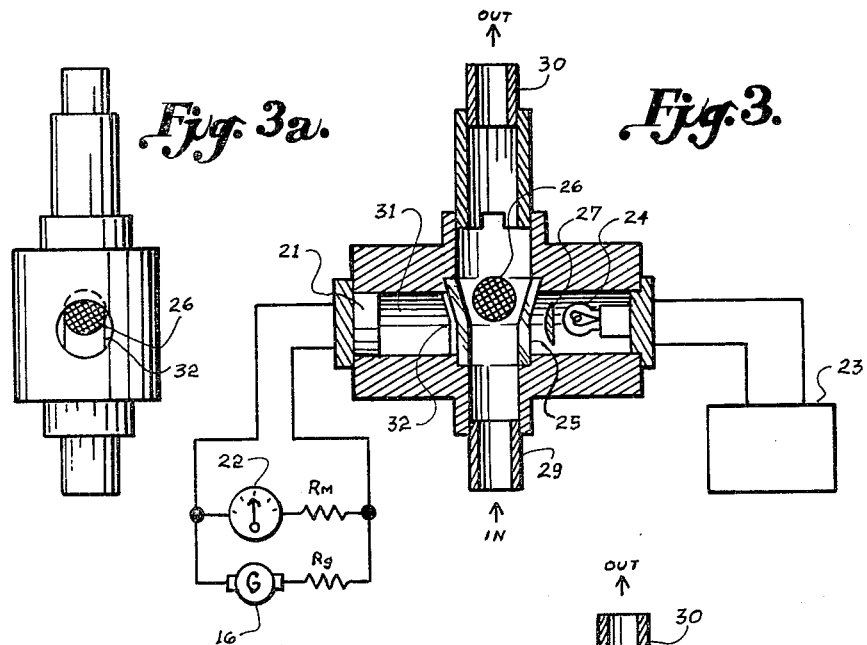
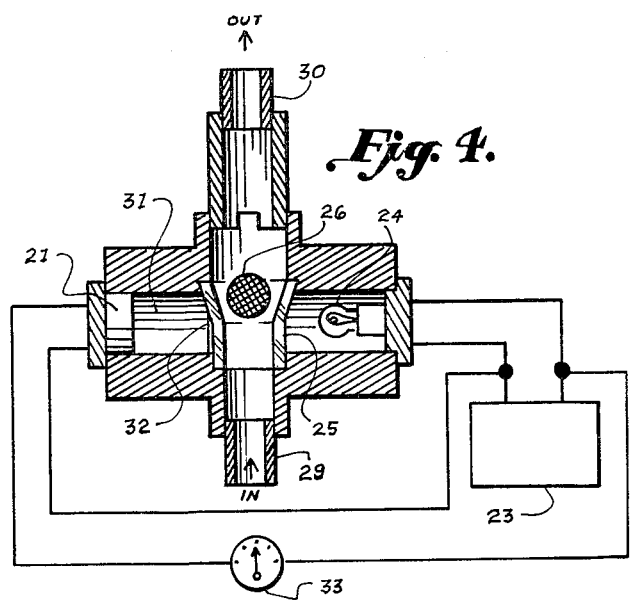
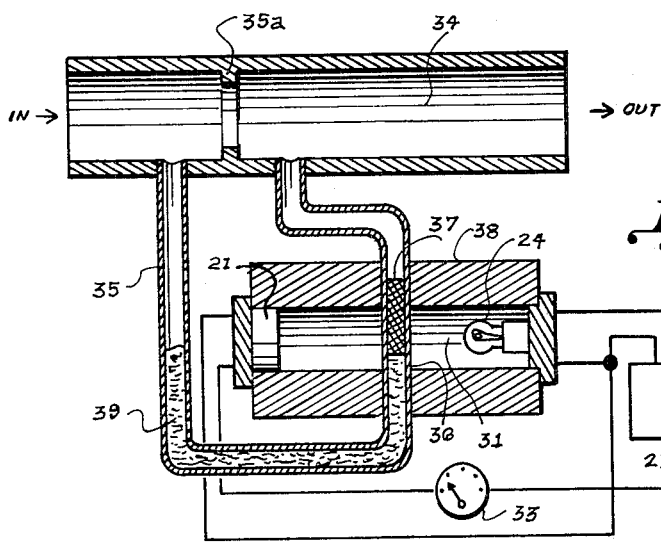
Inventor:
George Ctirad Spacek

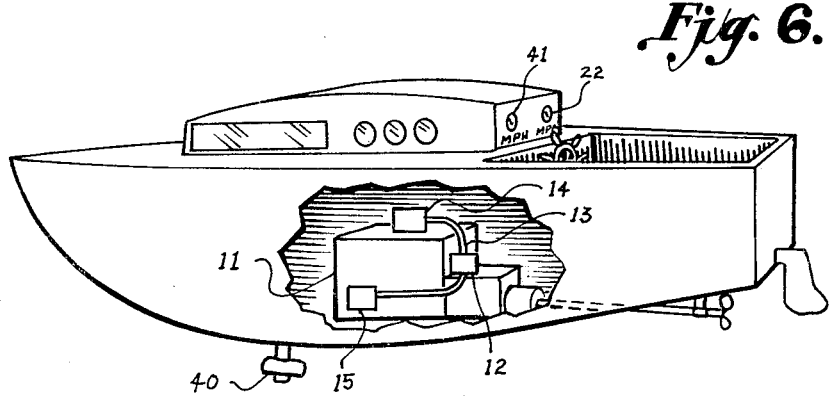
Fig. 6.
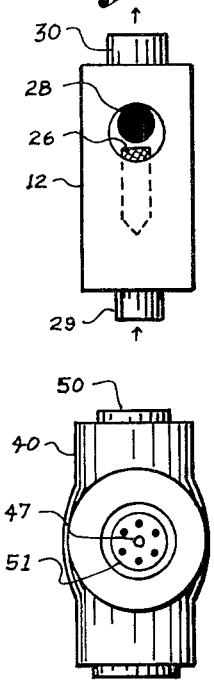
Fig. 7a.
Fig. 7b.
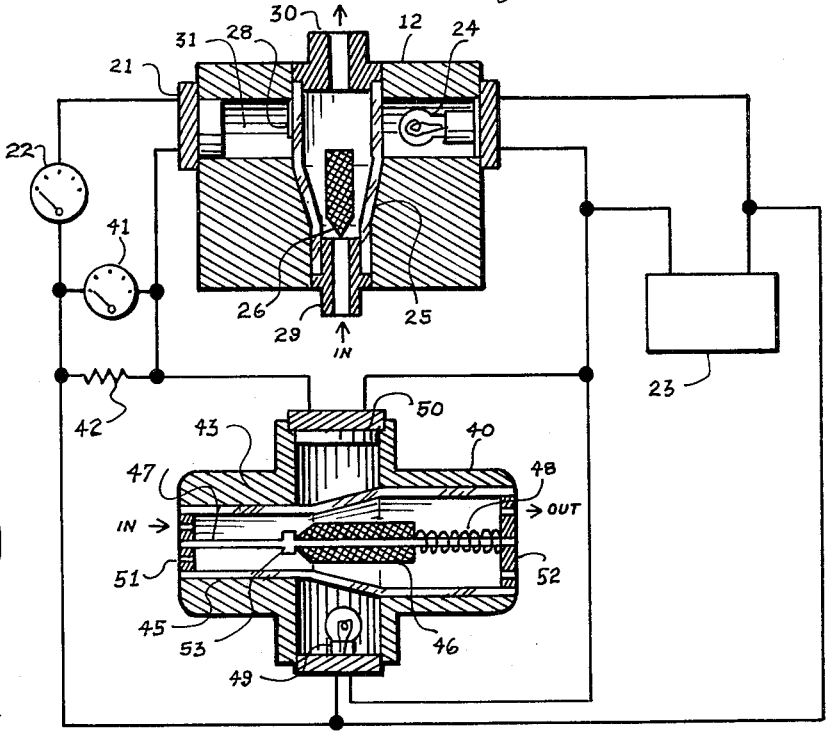
Fig. 7.
Inventor:
George Ctirad Spacek

FUEL CONSUMPTION INDICATOR

BACKGROUND OF THE INVENTION

Combustion engines are subject to numerous factors influencing efficiency, such as air-fuel mixture, adjustment, ignition timing and spark plug condition, quality of fuel, etc. In the case of vehicles propelled by combustion engines, additional factors are road condition, tire pressure, cleanliness of hull for marine vehicles and altitude for aircraft. Since the primary energy source of a combustion engine is fuel, accurate and instantaneous knowledge of the fuel consumption would give the operator of the engine or vehicle valuable information about overall efficiency, and thus allowing him to make corrections, if necessary, to provide the most economy in the operation of the engine or vehicle. For boats and airplanes, instantaneous knowledge of fuel consumption would allow the operator to predict how far can be travelled before exhausting his fuel supply.

At the present time considerable stress is being placed on minimizing of air pollution by automobiles. It will be apparent that an automobile engine which is maladjusted and operates with small efficiency will produce more exhaust gases per horsepower developed than an engine tuned-up for maximum efficiency. From this point too, therefore, it is important that the operator of the motor vehicle know continuously what is the overall efficiency of the vehicle in terms of horsepower developed per fuel consumed.

From the above follows that a device which would measure continuously and instantaneously the fuel consumption of a motor vehicle and of stationary engines, either in miles per gallon or in gallons per hour, would fulfill an important function. The desirability of such a device was recognized in the past, as evidenced by the relatively large number of patents issued in this field. Yet none of the devices patented was commercially manufactured up to the present in a significant quantity. A study of the nature of the problem reveals why none of the devices of present art has found a wide acceptance.

In order to obtain a convenient read-out device and to be able to relate the flow of fuel to the speed of the vehicle, it is necessary to measure the fuel flow and to transform it to an electrical quality, such as resistance, reactance or voltage, the magnitude of which is proportional to the fuel flow. Now, all devices of present art use a flowmeter incorporating a restriction commonly called a float and placed in the fuel stream, the displacement of which, proportional to the flow, is coupled to a variable resistor, commonly referred to as rheostat. The resistance of the rheostat in the devices of present art is changed by providing either a mechanical or magnetical coupling between the float and the wiper arm of the rheostat. The mechanical or magnetical coupling is the principle drawback of fuel consumption meters of present art. This becomes apparent once it is realized that the fuel flow into a stationery or automobile engine is very small, typically ranging from 30 cc per minute to 500 cc per minute. The energy needed to move the wiper arm of the rheostat is extracted from the kinetic energy of the fuel. The amount of energy available from the fuel is in turn proportional to the flow restriction by the float. Because of the friction of the wiper arm, the energy will not be sufficient to move it, unless the fuel flow is considerably restricted. This interferes with proper operation of the engine, however.

If a mechanical linkage is provided between the float and wiper of the rheostat, it must be sealed against fuel leakage. To overcome the friction of the seal, the fuel flow must be additionally restricted. If a magnetic coupling is used between the float and the wiper, the need for seal is eliminated, and, if the spring tensions of the wiper is made small enough, the friction can be significantly reduced. However, this still will not provide satisfactory operation of the combustion engine, because of the large mass and thus inertia of the float, magnet and wiper assembly. When, especially during acceleration, the fuel requirement of the engine is suddenly increased, the flowmeter must respond immediately by displacing the float into a position at which the cross sectional area is larger. Since the float is magnetically coupled with the wiper, the magnet and the wiper must also move immediately. The force needed to move the float, magnet, wiper assembly is proportional to the mass and the acceleration of the assembly. If the mass is large, the acceleration will be small, causing delay in the fuel supply with resulting deficient performance of the engine under varying load conditions. Experiments made by the applicant have shown that if the mass of the float with the associated magnetic or mechanical linkage exceeds 10 grams, acceleration of a passenger automobile is noticeably less than if the flowmeter is removed. From the above considerations it follows that a flowmeter with large moving mass is not suitable for measuring fuel consumption of automobiles or of small to medium stationery combustion engines, unless they work under constant load, which is seldom the case. Rather, a flowmeter for this application must either have no moving mass at all or the moving mass must be minimized.

The fuel consumption of vehicles propelled by combustion engines is more meaningfully expressed in terms of distance travelled per volume of fuel consumed, rather than in terms of fuel volume per time. For this, an electrical signal in proportion to the speed of the vehicle must be generated, in addition to the electrical signal generated in proportion to the fuel consumption. For automobiles and trucks, the electrical signal proportional to speed can conveniently be generated with DC or AC generator, coupled either to the wheels of the vehicle or to a speedometer drive shaft, with which all such vehicles are equipped. However, for boats and airplanes a different means of generating an electrical signal proportional to the speed must be devised. Boats and airplanes are in most cases equipped with a speedometer. These speedometers are either of the pressure type, or of the propeller type. Pressure-type speedometer is not effective for low speeds and propeller-type speedometer increases the water or air resistance of the vehicle. Thus, in order to generate an electrical signal in proportion to the speed of the boat or airplane, a speedometer must be devised which responds even to small speeds of the vehicle and which introduces as small a resistance to the motion of the vehicle as possible. In other words, the speedometer must extract only a very small amount of energy of the moving vehicle. This is a requirement similar to the desired characteristics of a flowmeter for fuel consumption. A device suitable for measuring of fuel consumption of combustion engine can therefore be used with only minor modifications for measuring of speed of boats and airplanes.

SUMMARY OF THE INVENTION

It is an object of the present invention to provide a method of measuring gallons per hour performance and miles per gallon performance of combustion engines and of vehicles propelled by combustion engines, which takes into account variations in the several factors influencing efficiency, thereby permitting use of continuous and instantaneous indications which are substantially accurate at any given moment in the operation of such an engine or vehicle.

It is another object of the invention to provide a flow transducer which measures the flow of fuel into a combustion engine without causing pressure loss and delay in the fuel supply and which generates electrical signal in proportion to the fuel consumption.

Still another object of the invention is to provide a flow transducer specifically adapted for measuring the speed of boats and airplanes and generating electrical signal in proportion to the speed of the vehicle.

The essential characteristic of the invention is a flow transducer, in which the position of a float varies in accordance with the flow and in which the float is placed between a source of light and a variable resistance element responsive to light intensity, commonly referred to as a photoconductive cell or photocell. The float is made of opaque material and it varies the light level striking the photocell in accordance with the flow. The resulting resistance variation of the photocell is utilized to change the deflection of a meter responsive to electric energy, preferably an ma-meter. For fuel consumption per time, the ma-meter is connected in series with the photocell and with a source of constant electrical energy, such as a battery, and the meter is preferably calibrated in gallons per hour. For fuel consumption per mile travelled the ma-meter is connected in series with the photocell and in series with a source of variable electrical energy, the voltage of which varies in proportion to the speed of the vehicle. In this case the ma-meter is preferably calibrated in miles per gallon. For speed indication of boats and airplanes, and for indication of wind and water-current velocity on stationary installations, the flow transducer is exposed to the surrounding water or air and is electrically connected in the same manner as for fuel consumption per time. In this case the ma-meter is preferably calibrated in miles per hour.

BRIEF DESCRIPTION OF DRAWINGS

To afford a better understanding of the invention, reference is now made to the accompanying drawings in the several views of which corresponding parts have been designated similarly and in which:

FIG. 3 is a cross sectional view of a variable orifice flow-to-conductance transducer together with wiring diagram showing the electrical connections of the individual components of the miles per gallon indicator.

FIG. 3A is a side view of the flow-to-conductance transducer of FIG. 3.

FIG. 4 is a cross sectional view of the variable orifice flow-to-conductance transducer together with a wiring diagram showing the electrical connections of the individual components of a gallons per hour indicator.

FIG. 5 is a cross sectional view of a constant orifice flow-to-conductance transducer.

FIG. 6 is a simplified view showing components of a miles per gallon indicator and of a miles per hour indicator installed in a boat.

FIG. 7 is a cross sectional view of a flow-to-resistance transducer for measuring the fuel flow and of a flow-to-conductance transducer for measuring the speed of a boat or airplane together with a wiring diagram showing the electrical connections of the individual components of the miles per gallon indicator and of the miles per hour indicator.

FIG. 7A is a side view of the flow-to-resistance transducer of FIG. 7.

FIG. 7B is a side view of the flow-to-conductance transducer of FIG. 7.

DESCRIPTION OF THE PREFERRED EMBODIMENT

Figure 1:
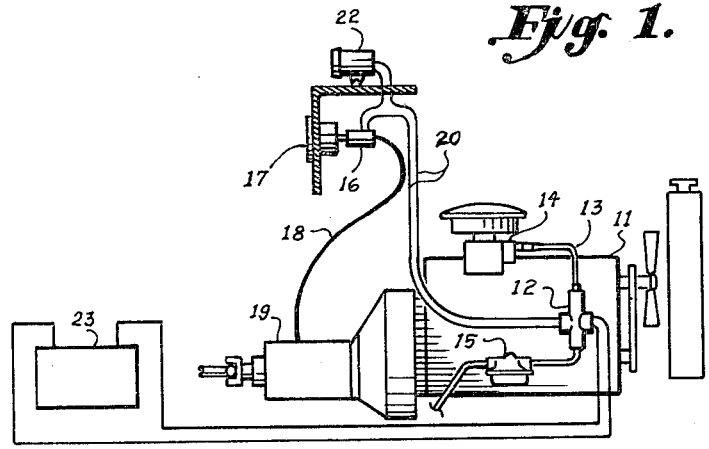
FIG. 1 is a simplified view showing components of a miles per gallon indicator installed in a vehicle.

With reference to the drawings, FIG. 1 and FIG. 2, 2A and 2B illustrate an arrangement in which an automobile power plant 11 has been equipped with a miles per gallon indicator. A flow-to-resistance transducer 12 for measuring of the fuel flow is connected by the fuel line 13 between the carbuerator 14 and the fuel pump 15 of the automobile engine. A current generator 16 is inserted between a speedometer 17 and a flexible drive shaft 18, with which all cars are normally equipped. The flexible drive shaft 18 is driven by the transmission 19 of the automobile and the revolutions of the flexible drive shaft 18 are directly proportional to the speed of the automobile.

The current generator 16 is driven by the flexible drive shaft 18 and is so constructed that its electrical output is linearly proportional to the revolutions of the flexible drive shaft 18. Since the flexible drive shaft revolutions are directly proportional to the speed of the automobile, the electrical output of the generator 16 is also directly proportional to the speed of the automobile. The current generated by the generator 16 is transmitted with wires 20 to a photoconductive cell 21 of the flow-to-resistance transducer 12. The electrical resistance of the photoconductive cell, commonly called photocell, is responsive to light level. In series with the current generator 16 and with the photocell 21 is connected a meter 22 responsive to the current flowing through wires 20. The meter 22 is directly calibrated in miles per gallon. A source 23 of substantially constant voltage electrical energy, preferably a battery, is connected to a light bulb 24 of the flow-to-resistance transducer 12.

Figure 2A:
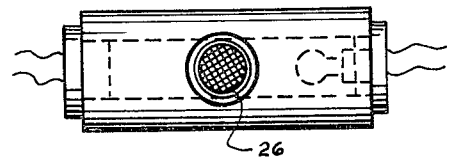
FIG. 2A is a top view of the flow-to-resistance transducer of FIG. 2.
Figure 2B:
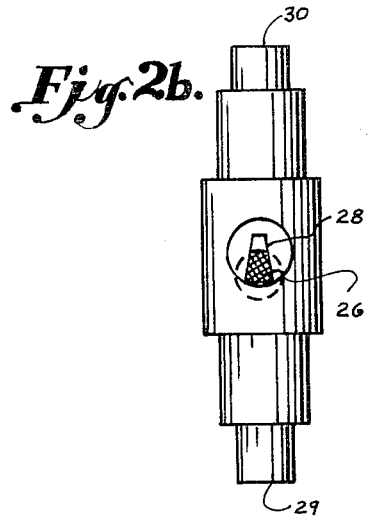
FIG. 2B is a side view of the flow-to-resistance transducer of FIG. 2.
Figure 2:
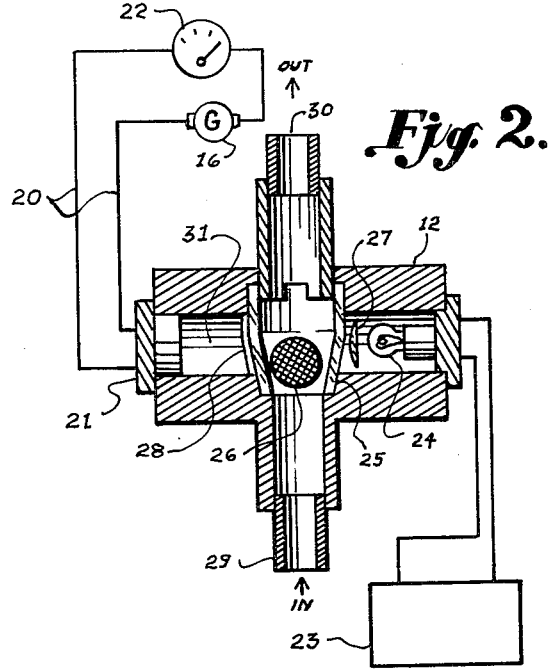
FIG. 2 shows a cross sectional view of a variable orifice flow-to-resistance transducer together with a wiring diagram showing the electrical connections of the individual components of the miles per gallon indicator.

With reference specifically to FIG. 2, 2A and 2B, the flow-to-resistance transducer 12 for measuring of the fuel flow is made of an opaque material, with the exception of a tapered fuel line section 25, which is made of a material transparent to light. A preferably spherical body 26, made of an opaque material, is placed inside of the preferably cylindrical tapered fuel line section 25. It is common in the trade to call the body 26 a "float," although it must be made out of a material with larger specific gravity than the specific gravity of the fuel and it does not therefore float. For conformity, the expression "float" will therefore be used for the body 26.

A lens 27 and an optical mask 28 are placed between the light bulb 24 and the photocell 21. A preferably cylindrical light channel 31, allowing propagation of light from the light bulb to the photocell, extends crosswise to the fuel line axis.

The working mechanism of the miles per gallon indicator of this invention is as follows:

By definition, miles per gallon is speed in miles per hour of the automobile divided by the fuel consumption, in gallons per hour, of the automobile. Thus: miles per gallon = (miles/hour/gallon/hour) = (miles/gallon). The mathematical form of this expression is identical with the relationship between voltage, resistance and current of an electrical circuit, the relationship being commonly called Ohm's Law. The Ohm's Law states that current is voltage divided by resistance. Thus if the speed of the automobile is transduced to voltage and the fuel flow is transduced to resistance, the current flowing in the circuit will be directly proportional to the miles per gallon performance of the automobile. In the present invention, the speed of the automobile is transduced linearly to voltage with the preferably direct-current generator 16, the fuel flow of the automobile is transduced linearly to resistance with the flow-to-resistance transducer 12, and the miles per gallon performance is indicated by the preferably DC milliampermeter 22.

The flow-to-resistance transducer 12 functions as follows:

Fuel entering through fitting 29 and leaving through fitting 30 develops a pressure drop across the float 26. The pressure drop overcomes the effective weight of the float 26 and lifts it into a higher position, in which the pressure drop becomes smaller due to the increased cross section of the tapered fuel line 25. The up-lift motion of the float stops as soon as the pressure drop becomes equal to the effective weight of the float. The effective weight of the float is equal to its weight in vacuum less its buoyancy in the fuel. The effective weight of the float can therefore be made as small as desired simply by making it out of a material only slightly denser than the density of the fuel.

Because the tapered fuel line section 25 is essentially linear, the displacement of the float as function of flow is essentially linear. The resistance variation as function of flow is accomplished by placing the transparent and tapered fuel line section 25 between the light bulb 24 and the photocell 21. With no flow, the float 26 sinks down below the tapered fuel section 25. Consequently, light emerging from the light bulb illuminates fully the photocell, causing its resistance to become small. With increasing flow, the float 26 starts to rise and, since it is opaque, reduces the light striking the photocell, causing its resistance to increase. At the maximum flow, the float fully intercepts the light emerging from the light bulb, such that the photocell 21 is not illuminated and its resistance is therefore maximum.

Because the displacement of the float is linearly proportional to the flow, the light level striking the photocell would be substantially in linear proportion to the flow also. However, this is not desired, because the conductance, not the resistance, of a photocell is linearly proportional to the light level; since resistance is an inverse function of conductance, light level linearly proportional to flow and striking the photocell would not provide a linear resistance increase of the photocell with respect to flow increase. To obtain linear relationship between flow and resistance, the mask 28 is inserted in the path of light between the photocell and the light bulb. The optical mask 28, which is painted on the transparent tapered fuel line 25, is shaped in such a way that the resistance of the photocell is linearly proportional to the flow through the fuel line. A representative shape of the mask is shown in FIG. 2B, which is a side view of the flow-to-resistance transducer 12 of FIG. 2, with the photocell 21 removed.

To further improve the linearity, a light-collimating lens 27 is placed between the light bulb 24 and the transparent tapered fuel line 25. However, the lens 27 can be eliminated if the separation between the light bulb 24 and the photocell 21 is made large compared with the diameter of the photocell 21.

Other characteristics of the miles per gallon indicator with flow-to-resistance transducer, required for correct indication of the gas mileage of the vehicle are obvious to those skilled in the art and they are mentioned here only for completeness: The resistance of the current generator 16 and of the indicating meter 22 should be small compared with the photocell 21. This is easily accomplished with devices available in the trade, as the resistance of photocells is typically between 500 to 100,000 ohms, the resistance of DC-generators, commonly referred to as tachometer-generators, is about 30 ohms and the resistance of DC-milliampermeters is about 50 ohms. For high speed of an automobile and low fuel consumption, as happens for example when coasting down a steep hill, the miles per gallon performance of the automobile is approaching infinity, resulting in large and possibly damaging current through the indicating meter 22.

A solution to prevent damage to the meter 22 under this condition is to place a semiconductor-diode type, commonly referred to as Zener diode, across the meter terminals. The Zener diode is selected to have a breakdown-voltage equal to the highest voltage which the meter 22 will survive without damage, such that any voltage exceeding this value will be absorbed by the diode. The Zener diode is not shown in FIG. 2, as its employment is anticipated by those skilled in the art. Moreover, the need for the Zener diode can be eliminated if the indicating meter 22 is constructed to survive a short-term overload. Practically all DC-milliampmeters commercially available at the present are so constructed.

This completes the description of the invention of miles per gallon indicator with the flow-to-resistance transducer.

A configuration of a miles per gallon indicator with a flow-to-conductance transducer is shown in FIG. 3 and FIG. 3A.

The miles per gallon indicator with the flow-to-conductance transducer employs the same components as the device depicted in FIG. 2, 2A and 2B, and the same numbering system for the identical components of both transducer types is used in FIG. 3 and FIG. 3A as in FIG. 2, 2A and 2B.

The only essential difference between the flow-to-conductance transducer and the flow-to-resistance transducer is the electrical connection, the location of the transparent tapered fuel line, and the shape of the optical mask. As mentioned under the description of the flow-to-resistance transducer, the conductance of a photocell is linearly proportional to the level of light incident on it. In order to make the resistance of the flow-to-resistance transducer linear with respect to flow, an optical mask must be used which complicates the device manufacturing. In the flow-to-conductance transducer shown in FIG. 3 and FIG. 3A, the light incident on the photocell 21, and thus its conductance, is directly proportional to flow. This is accomplished by locating the transparent tapered fuel line 25 such that the narrow dimension of the taper is substantially centered on the light channel 31. For this location of the tapered fuel line 25, at no flow the float 26 fully intercepts the light beam, thus preventing the light from striking the photocell 21. With increased flow, the float 26 rises, allowing more light to strike the photocell 21, until at maximum rated flow the float is fully outside of the light beam. Consequently, the conductance of the photocell 21 is directly proportional to the flow.

Experiments have shown that the linearity between flow and conductance of the transducer depicted in FIG. 3 and FIG. 3A is satisfactory with no light mask at all, and excellent with a simple longitudinal light mask 32.

In parallel with the photocell 21, is electrically connected indicating meter 22 responsive to electric current and generator 16 of electrical energy, the voltage of which is proportional to the speed of the automobile. Preferable installation of the indicating meter 22 and of the generator 16 in the automobile is the same as shown in FIG. 1.

In contrast with the miles per gallon indicator with flow-to-resistance transducer, the internal resistance $R_g$ of the generator 16 and the internal resistance $R_m$ of the indicating meter 22 must be large compared with the resistance of the photocell 21.

In FIG. 4 is shown an electrical embodiment of the flow-to-conductance transducer for measuring of flow per unit time, such as gallons per hour. The transducer is identical to that shown in FIG. 3 and FIG. 3A. However, the electrical connections are different in that the photocell 21 is connected in series with a meter 33 responsive to electric current, preferably a DC ma-meter, and in series with a substantially constant voltage source 23, preferably a battery. Liquid or gas entering fitting 29 and leaving through fitting 30 builds up pressure differential across the float 26, forcing it to rise until the pressure differential is just equal to the effective weight of the float. The upward motion of the float allows more light emerging from light bulb 24 to strike the photocell 21, thus increasing its conductance in proportion to flow. Increased conductance of the photocell causes larger current to flow through meter 33. The meter 33 is calibrated preferably directly in gallons per hour.

The flow-to-conductance transducer of FIG. 3, 3A and 4 is not suitable for flow measurement of opaque liquids and gases. For this reason a flow-to-conductance transducer configuration was developed which employs a constant area orifice and is suitable to measure flow of opaque liquids and gases. FIG. 5 shows a typical embodiment of a flow-to-conductance transducer with constant area orifice. A gas or liquid flowing through a pipe 34 builds up a pressure differential across a constant area orifice 35a. A U-shaped tube 35, of substantially smaller cross sectional area than the pipe 34, penetrates with its ends the pipe 34 before and after the orifice 35, as referenced to the direction of flow. The tube 35 is partially filled with a transparent liquid 39 and a section 36 of the tube is made out of a light-transparent material. An opaque float 37, freely movable in the pipe section 36, is inserted in one branch of the tube and is buoyant in the transparent liquid. The transparent tube section 36 penetrates an opaque body 38 of preferably cylindrical shape and serves to house a light bulb 24 and a photocell 21. A light channel 31 extends across the body 38 as shown. The light channel 31 is so constructed that no light can transmit through it when the float 37 is located substantially across the light channel. This is accomplished by making the diameter of the light channel 31 either smaller than the diameter of tube section 36, or by making the light channel cross section rectangular in the area of the tube section 36, with the narrow dimensions of the rectangular cross section less than the diameter of the tube section 36.

With no flow through pipe 34, the transparent liquid 39 is in an equilibrium position and at substantially the same level in both branches of the U-shaped tube 35. The light channel 31 is so located that under this condition float 37 prevents light emerging from light bulb 24 to strike the photocell 21. Consequently, the conductance of photocell 21 is low and only very small current flows in the electrical circuit consisting of photocell 21, current responsive meter 33 and source of constant voltage 23.

Flow of liquid or gas through pipe 34 builds up a pressure differential across the orifice 35a, causing the transparent liquid in the tube 35 to shift from its equilibrium position such that the level of the liquid is higher in the branch of the tube provided with the transparent section 36.

The higher liquid level causes the buoyant float 37 to rise in proportion to the pressure differential across orifice 35, and thus in proportion to the flow in pipe 34. The upward motion of float 37 allows light emerging from bulb 24 to strike photocell 21, thus causing current through meter 33 to increase in proportion to the flow.

The constant orifice flow transducer of FIG. 5 could be modified to provide an increase of resistance of the photocell 21 with flow simply by relocating the position of the light channel 31 with respect to the position of float 37. In this case it would not be necessary that the liquid 39 is transparent. The constant orifice flow transducer so modified could be used in principle in place of the variable orifice flow-to-resistance transducer of FIG. 2 for gas mileage indication; however, a variable orifice flow transducer is preferred for gas mileage indication, as its pressure drop is constant and does not increase with fuel flow.

Some vehicles, such as boats and airplanes, are not normally equipped with a shaft the revolutions of which are proportional to the speed of the vehicle. For such vehicles a miles per gallon indicator was devised which employs a flowmeter to measure the speed of the vehicle relative to the surrounding air or water. A typical embodiment of such a miles per gallon indicator for boat installation is shown in FIG. 6, its internal structure and electrical connections are shown in FIG. 7 and 7A. With reference to FIG. 6, a flow-to-resistance transducer 12 is connected via fuel line 13 between the carbuerator 14 and fuel pump 15 of the boat engine 11. A flow-to-conductance transducer 40 for measuring of the boat speed relative to surrounding water is installed preferably outside of the boat hull below the waterline. Alternately, the transducer 40 could be installed inside of the hull and connected with tubing to a water scoop and discharge port located on the exterior of the hull.

The structure of the flow-to-resistance transducer 12 for measuring of fuel flow is the same as for the flow-to-resistance transducer of FIG. 2 and FIG. 2B, with the exception of minor differences in the shape of the float 26 and of the optical mask 28. The slightly different float and optical mask are not of specific importance for the miles per gallon indicator for marine application and they are shaped as shown in FIG. 7 and FIG. 7A merely to illustrate the latitude open in their design. The bullet-shaped float 26 is somewhat easier to manufacture in small quantities than a spherical float. Similarly, a circular opaque mask 28, excentrically placed with respect to the light channel 31, is easier to manufacture or to paint than the trapezoidal mask 26 of FIG. 2B. For brevity, the functioning of the flow-to-resistance transducer 12 for measuring of the fuel flow will not be repeated here, as it is identical with the function of the transducer of FIG. 2A and FIG. 2B. However, its electrical connection is different, in that the voltage, proportional to the speed of the vehicle, is not generated by a generator but derived from a voltage drop across a resistor 42. The voltage drop across the resistor 42 is generated by a current proportional to the speed of the boat and flowing through the resistor 42.

The current is generated by the flow-to-conductive transducer 40. The transducer 40 consists of an opaque body 43, shaped to minimize water resistance, of a tapered tube 45, made of transparent material, of an opaque float 46, of a guiding rod 47, and of a spring 48, of a light bulb 49, of a photoconductive cell 50, of an intake port 51 preferably provided with a filter screen and of a discharge port 52.

Water entering the intake port 51 builds up a pressure differential across float 46, which is freely movable on the guiding rod 47. The pressure differential moves the float against the spring 48. The lateral motion of the float 46 ceases when the differential pressure across the float is just equal to the spring tension. Since the differential pressure across the float 46 varies in accordance with the cross sectional area between the float and the tapered tube 45, the displacement of the float is proportional to the water flow and consequently to the speed of the boat relative to water.

With the boat at a standstill, no water streams through the flowmeter and the opaque float rests against a stop 53, which is an enlarged diameter of the guiding rod 47. The float 46 is opaque to light, preventing light emerging from bulb 49 to strike the photocell 50. Under this condition the resistance of the photocell 50 is high and substantially no electric current flows in a circuit formed by a battery 23, photocell 50 and resistor 42. Consequently, the voltage drop across resistor 42 is substantially zero. A meter 41, responsive to electric energy and preferably a DC mV-meter, is placed across resistor 42 for indication of the speed of the boat and is calibrated preferably in miles per hour. With the float position as illustrated, the meter 41 indicates 0 miles per hour speed. With the boat in motion, water flowing through the flow transducer 40 displaces the float 46 toward the discharge port 52, which allows light from the bulb 49 to strike photocell 50, causing its conductance to increase. This in turn results in increased current through resistor 42, which generates a voltage drop across this resistor in proportion to the speed of the boat. The voltage drop across resistance 41 is used as source of voltage, proportional to the speed of the boat, for the miles per gallon indicator, which consists of the flow-to-resistance transducer 12 and indicating meter 22, calibrated preferably in miles per gallon. The resistor 42 does not have to be physically installed in the circuit, but can be thought of as being the internal resistance of the speed indicating meter 41.

The flow-to-conductance transducer 40 is specifically adapted for speed measuring by orienting the float 46 horizontally, and by using the spring 48 as the restoring force. The advantage of such an arrangement is that the accuracy of speed indication is not affected by the position of the vehicle, which, especially for boats, might change considerably. However, for vehicles not exposed to drastic position changes, the flow-to-conductance transducer illustrated in FIG. 4, which uses gravity as the restoring force, could be used for speed indication. For this purpose, the transducer depicted in FIG. 4 would be provided with means to collect the water or air surrounding the vehicle.

The flow-to-conductance transducer 40 for speed measuring is a preferred device for generating of voltage proportional to speed. However, it will be understood that the essential condition is the generation of voltage proportional to the speed of the vehicle and any means for attaining this objective, such as DC-generator driven by a propeller and exposed to the surrounding water or air, will be within the spirit and scope of this invention.

Under some circumstances it might be desired to measure only the speed of the vehicle. This applies especially for sailboats and other vehicles not normally equipped with a combustion engine. For such application the flow-to-resistance transducer 12 and the meter 22 of FIG. 7 would be eliminated.

This completes the description of the miles per gallon indicator invention employing a fuel-flow transducer for modifying the current generated in proportion to the speed of the vehicle. The essential characteristic of the invention is a flow transducer with no frictional forces and with negligibly small moving mass.

Although the flow transducer employing a photoconductive cell for transducing the flow into an electrical quantity is a preferred configuration, it will be understood that any photoelectric device which converts light energy into electrical energy could be substituted for the photoconductive cell. With reference to chapter 21 of a text book titled "Electronic Fundamentals and Applications" by John D. Ryder published in 1959 by Prentice-Hall, Inc., such photoelectric devices include photoemissive cells, photovoltaic cells, photoconductive cells, photodiodes and phototransistors. A flow transducer employing such a photoelectric device would be within the scope and spirit of the miles per gallon, gallons per hour and miles per hour indicator invention, provided that an optical mask is employed to give an essentially linear relationship between the flow and the electrical energy thus modified by the photoelectric device.

What is claimed:

1. An indicating instrument for automatically indicating the distance travelled by a self-propelled vehicle per unit of fuel consumed thereby, comprising in combination, means for generating a variable electrical energy in proportion to the speed of the self-propelled vehicle, an electro-optical flow transducer for modifying the magnitude of the generated electrical energy in essentially linear proportion to the flow of fuel to the engine, and means for indicating the resultant modified value of electrical energy in units of distance travelled per unit of fuel consumed, said electro-optical flow transducer comprising in combination, an opaque exterior body, a tapered flow tube within the opaque body and essentially vertically oriented, a source of light, an electrical element the resistance of which is responsive to light level, said tapered flow tube being located between said electrical element and said light source and transparent to the light emerging from the light source, the longitudinal axis of the said tapered flow tube being oriented crosswise with respect to an imaginary line connecting the source of light and the said electrical element, an opaque float of higher density than the fuel density and located within the tapered flow tube and freely movable within it, said tapered flow tube being so positioned with respect to the said electrical element that at maximum rated flow the said float intercepts light emerging from the light source thus essentially preventing the light from illuminating the said electrical element, an optical mask inserted between the said source of light and between the said electrical element, said optical mask being shaped to provide an essentially linear relationship between the flow through the said tapered flow tube and the resistance of the said electrical element.

2. An indicating instrument for automatically indicating the distance travelled by a self-propelled vehicle per unit of fuel consumed thereby, comprising in combination, means for generating a variable electrical energy in proportion to the speed of the self-propelled vehicle, an electro-optical flow transducer for modifying the magnitude of the generated electrical energy in essentially linear proportion to the flow of fuel to the engine, and means for indicating the resultant modified value of electrical energy in units of distance travelled per unit of fuel consumed, said electro-optical flow transducer comprising in combination an opaque exterior body, a tapered flow tube within the opaque body and essentially vertically oriented, a source of light, an electrical element, the resistance of which is responsive to light level, said tapered flow tube being located between said electrical element and said light source and transparent to the light emerging from the light source, the longitudinal axis of the said tapered flow tube being oriented crosswise with respect to an imaginary line connecting the source of light and the electrical element, an opaque float of higher density than the fuel density and located within the tapered flow tube and freely movable within it, said tapered flow tube being so positioned with respect to the said electrical element that at minimum rated flow the said float intercepts light emerging from the light source thus essentially preventing the light from illuminating the said electrical element, an optical mask inserted between the said source of light and between the said electrical element, said optical mask being shaped to provide an essentially linear relationship between the flow through the said tapered flow tube and the conductance of the said electrical element.

3. An instrument for automatic speed indication of a vehicle, comprising in combination, an electro-optical flow transducer for measuring the flow of surrounding water or air relative to the vehicle, a source of electrical energy of substantially constant voltage, said electro-optical flow transducer modifying the current generated by the source of electric energy in proportion to the flow of surrounding water or air relative to the vehicle, said electro-optical flow transducer comprising in combination, an opaque exterior body, a tapered flow tube within the opaque body and essentially vertically oriented, a source of light, an electrical element, the resistance of which is responsive to light level, said tapered flow tube being located between said electrical element and said light source and transparent to the light emerging from the light source, the longitudinal axis of the said tapered flow tube being oriented crosswise with respect to an imaginary line connecting the source of light and the electrical element, an opaque float of higher density than the fuel density and located within the tapered flow tube and freely movable within it, said tapered flow tube being so positioned with respect to the said electrical element that at minimum rated speed the said float intercepts light emerging from the light source thus essentially preventing the light from illuminating the said electrical element, an optical mask inserted between the said source of light and between the said electrical element, said optical mask being shaped to provide an essentially linear relationship between the speed of the vehicle and the conductance of the said electrical element, and means responsive to the value of the modified current for indication of the speed of the vehicle.

4. A flow transducer for measuring the flow of liquids and gases, comprising in combination, a source of electric energy, means for modifying the value of the electric energy in proportion to the flow, means for indicating the value of the modified electric energy, said means for modifying the value of the electric energy in proportion to the flow comprising in combination, a flow tube, an opaque body, means for changing the position of the said opaque body in proportion to the flow, a source of light, an electrical element the conductance of which is responsive to light level and an optical mask, said opaque body being located between the said source of light and the said electrical element such that position changes of the opaque body, caused by the flow, intercept light emerging from the said light source, said optical mask being inserted between the said source of light and between the said electrical element and shaped to provide an essentially linear relationship between the flow through the said flow tube and the conductance of the said electrical element.

5. A flow transducer for measuring the flow of fluids, comprising in combination, a source of substantially constant electrical energy, means for modifying the value of the electric energy in proportion to the flow, means for indicating the value of the modified electric energy, said means for modifying the value of the electric energy in proportion to the flow, comprising in combination, an opaque exterior body, a tapered flow tube within the opaque body and essentially vertically oriented, an opaque float of higher density than the fluid density and located within the tapered flow tube and freely movable within it, a light source, an optical mask, an electrical element the conductance of which is responsive to light level, said tapered flow tube being located between said electrical element and said light source and transparent to the light emerging from the light source, the longitudinal axis of the said tapered flow tube being oriented crosswise with respect to an imaginary line connecting the source of light and the electrical element, said tapered flow tube being so positioned with respect to the said electrical element that the float, propelled by differential pressure generated by the flow, intercepts light emerging from the said light source, the said optical mask being inserted between the light source and the electrical element and shaped to provide an essentially linear relationship between the flow and the conductance of the electrical element.

6. A device as set forth in claim 5, wherein elastic means are employed in place of gravity to counteract forces generated by the flow on the float, thus eliminating the necessity to orient the flow tube vertically.

* * * * *